(12) United States Patent
Miyata

(10) Patent No.: US 7,588,264 B2
(45) Date of Patent: Sep. 15, 2009

(54) AIRBAG SYSTEM AND MOTORCYCLE WITH AIRBAG SYSTEM

(75) Inventor: Yasuhito Miyata, Minato-Ku (JP)

(73) Assignee: Takata Corporation, Tokyo (JP)

(*) Notice: Subject to any disclaimer, the term of this patent is extended or adjusted under 35 U.S.C. 154(b) by 114 days.

(21) Appl. No.: 11/626,722

(22) Filed: Jan. 24, 2007

(65) Prior Publication Data

US 2007/0170703 A1 Jul. 26, 2007

(30) Foreign Application Priority Data

Jan. 25, 2006 (JP) .............................. 2006-016849

(51) Int. Cl.
*B60R 21/20* (2006.01)

(52) U.S. Cl. .................. 280/730.1; 280/743.2

(58) Field of Classification Search .............. 280/730.1, 280/743.1, 728.3
See application file for complete search history.

(56) References Cited

U.S. PATENT DOCUMENTS

| | | | |
|---|---|---|---|
| 5,873,598 A * | 2/1999 | Yoshioka et al. | ............ 280/740 |
| 6,007,090 A | 12/1999 | Hosono et al. | |
| 6,264,237 B1 | 7/2001 | Terada | |
| 6,619,691 B1 * | 9/2003 | Igawa | ........................ 280/732 |
| 6,692,024 B2 * | 2/2004 | Fischer et al. | ............ 280/743.1 |
| 7,331,600 B2 * | 2/2008 | Miyata | ..................... 280/730.1 |
| 7,404,570 B2 * | 7/2008 | Miyata | ..................... 280/728.2 |
| 2003/0214122 A1 | 11/2003 | Miyata | |
| 2004/0207189 A1 * | 10/2004 | Miyata | ..................... 280/743.2 |

FOREIGN PATENT DOCUMENTS

| | | |
|---|---|---|
| EP | 1721818 | 11/2006 |
| EP | 1721819 | 11/2006 |
| JP | 2002-137777 | 5/2002 |
| JP | 2002-137779 | 5/2002 |
| JP | 2002-137780 | 5/2002 |
| JP | 2003-011871 | 1/2003 |

OTHER PUBLICATIONS

European Search Report dated Feb. 13, 2008 relating to European Patent Application No. 07000703.4—2425.

* cited by examiner

*Primary Examiner*—Paul N. Dickson
*Assistant Examiner*—Drew J. Brown
(74) *Attorney, Agent, or Firm*—Fitch, Even, Tabin & Flannery

(57) ABSTRACT

A technique is provided effective in improving rider retraining performance of an airbag in a motorcycle airbag system to be mounted to a motorcycle. In one form, an airbag system to be mounted to a motorcycle is constructed such that the way of folding the airbag is devised to set the fold release resistance of the rider-side airbag part lower than that of the other part of the airbag in the early stage of the airbag deployment.

6 Claims, 10 Drawing Sheets

AIRBAG SYSTEM AND MOTORCYCLE WITH AIRBAG SYSTEM

FIELD OF THE INVENTION

The present invention relates to a technique of constructing an airbag system to be mounted to a motorcycle.

BACKGROUND OF THE INVENTION

Various techniques for restraining the rider of a motorcycle with an airbag system mounted to the motorcycle are known. For example, known techniques include a technique of restraining the rider of a motorcycle in the event of a head-on collision by inflating an airbag housed in a case mounted to the body frame (refer to Japanese Unexamined Patent Application Publication No. 2002-137777). The technique presents the possibility of providing a wide restraint area of the airbag. However, for an airbag system to be mounted to a vehicle in which the periphery of the rider is open, such as a motorcycle, there is a great demand for improving the performance of restraining the rider by inflating the airbag in a desired state in the event of a head-on collision.

SUMMARY OF THE INVENTION

The present invention is made in view of this point. Accordingly, it is an object of the invention to provide a technique effective in improving the performance of restraining a rider by an airbag in an airbag system to be mounted to a motorcycle.

In order to attain the above object, the invention described herein is provided. The invention described herein is typically applicable to the construction of the airbag system to be mounted in various kinds of motorcycle. In this specification, "a motorcycle," a typical example of vehicles, includes various straddle-type vehicles that a rider straddles, such as touring motorcycles having a fuel tank in front of a rider seat and motor scooters having a space between a rider seat and a handlebar-supporting head pipe. In addition to the motorcycles, the "motorcycle" includes vehicles that riders straddle and that have three or more running wheels (e.g., three-wheel motorbikes for use in home delivery service and three- or four-wheel buggies for bad roads) and vehicles that riders ride on and that run by sleighs or caterpillars, such as snow mobiles.

A first form of the present invention for solving the problems is an airbag system to be mounted to a motorcycle, and includes at least an airbag, an airbag housing portion, and a gas supply device.

The airbag of the first form of the invention is for restraining a rider by deploying into a rider restraint region in front of the rider in a head-on collision of the motorcycle. The airbag folded in a specified folded state is housed in the airbag housing portion.

The gas supply device of the first form of the invention supplies airbag-inflation gas to the airbag so as to deploy the airbag into the rider restraint region in front of the rider in a head-on collision of the motorcycle. Typically, the gas supply device of the invention has the mechanism of generating airbag-inflation gas when sensing the head-on collision of the motorcycle and guiding the airbag inflation gas into the airbag. The "head-on collision" here broadly includes collisions with a running or still object in front of the motorcycle, for example, another vehicle, a pedestrian, or an obstacle. The "rider restraint region" here is defined as a space extending in the direction of the forward movement of a rider, for restraining the rider who is flung ahead of the motorcycle by a kinetic energy during a head-on collision.

Particularly, the airbag system of the first form of the invention is housed in the airbag housing portion in such a folded state that the fold release resistance of the rider-side airbag part of the airbag facing the rider is lower than that of the other part of the airbag. "The other airbag part" here is defined as a part other than the rider-side airbag part facing the rider, which typically corresponds to a front airbag part located at the front of the motorcycle. Thus, the airbag protrudes from the airbag housing portion in such a manner that the rider-side airbag part inflates earlier than the other part of the airbag in the early stage of the deployment of the airbag in the head-on collision of the motorcycle. The "release resistance" is for releasing the folded state, which is necessary for recovering from the specified folded state to the state before the fold, which substantially has a correlation with the recovery time until it recovers the state before the fold. That is, the recovery time necessary for releasing the fold becomes relatively long when the release resistance is relatively high; the recovery time necessary for releasing the fold becomes relatively short when the release resistance is relatively low. This arrangement allows the rider to be quickly restrained by the rider-side airbag part of the airbag in the early stage of the deployment of the airbag in a head-on collision of the motorcycle.

With the airbag system according to the first form of the invention, since the way of folding the airbag is devised so that the fold release resistance of the rider-side airbag part is low, the rider restraint performance of the airbag can be improved by a simple structure.

A second form of the present invention for solving the problems is an airbag system wherein the airbag housing portion described in the first form of the invention is disposed ahead of the rider, and the rider-side airbag part of the airbag is housed in the rear of the housing space of the airbag housing portion. That is, in this invention, the rider-side airbag part is disposed in the housing space of the airbag housing portion adjacent to the rider.

In the airbag system according to the second form of the invention, since the rider-side airbag with relatively low release resistance is disposed at the rear of the housing space of the airbag housing portion, the rider-side airbag can be quickly inflated toward the rider in the early stage of the deployment of the airbag.

A third form of the present invention for solving the problems is an airbag system wherein the airbag housed in the airbag housing portion described in the first or second forms of the invention is constructed such that the front airbag part of the airbag adjacent to the front of the motorcycle is rolled up, and the rider-side airbag part is pleated like an accordion so that the fold release resistance of the rider-side airbag part is lower than that of the roll-up of the front airbag part. The rolling-up is defined as a fold such that the airbag is rolled up, and the pleating is defined as a fold such that the airbag is pleated like an accordion.

The invention according to the third form provides an airbag system in which the front airbag part is rolled up and the rider-side airbag is pleated like an accordion so that the fold release resistance of the rider-side airbag part is low.

A fourth form of the present invention for solving the problems is an airbag system wherein the airbag housed in the airbag housing portion according to the third form of the invention is rolled up such that the front airbag part is rolled up toward the front of the vehicle, and the rider-side airbag part is pleated like an accordion such that the pleats are vertically piled.

The invention according to the fourth form provides an airbag system in which the front airbag part is rolled up toward the front of the vehicle, and the rider-side airbag part is pleated like an accordion such that the pleats are vertically piled so that the fold release resistance of the rider-side airbag part is low.

A fifth form of the present invention for solving the problems is a motorcycle equipped with an airbag system wherein the motorcycle is equipped with an airbag system in which an airbag deploys into a rider restraint region in front of the rider to restrain the rider when airbag-inflation gas is supplied to the airbag in a head-on collision of the motorcycle, wherein the airbag system is the airbag system according to any one of the first, second, third, or fourth forms of the invention.

The invention according to the fifth form therefore provides a motorcycle equipped with an airbag system having an airbag with improved rider restraint performance.

As described above, in an airbag system in which an airbag deploys into a rider restraint region in front of the rider to restrain the rider when supplied with airbag-inflation gas in a head-on collision of the motorcycle, the present invention allows the rider restraint performance of the airbag to be improved by particularly devising the way of folding the airbag to set the fold release resistance of the rider-side airbag part lower than that of the other part of the airbag in the early stage of the deployment of the airbag.

DETAILED DESCRIPTION OF THE PREFERRED EMBODIMENTS

Figure 1:
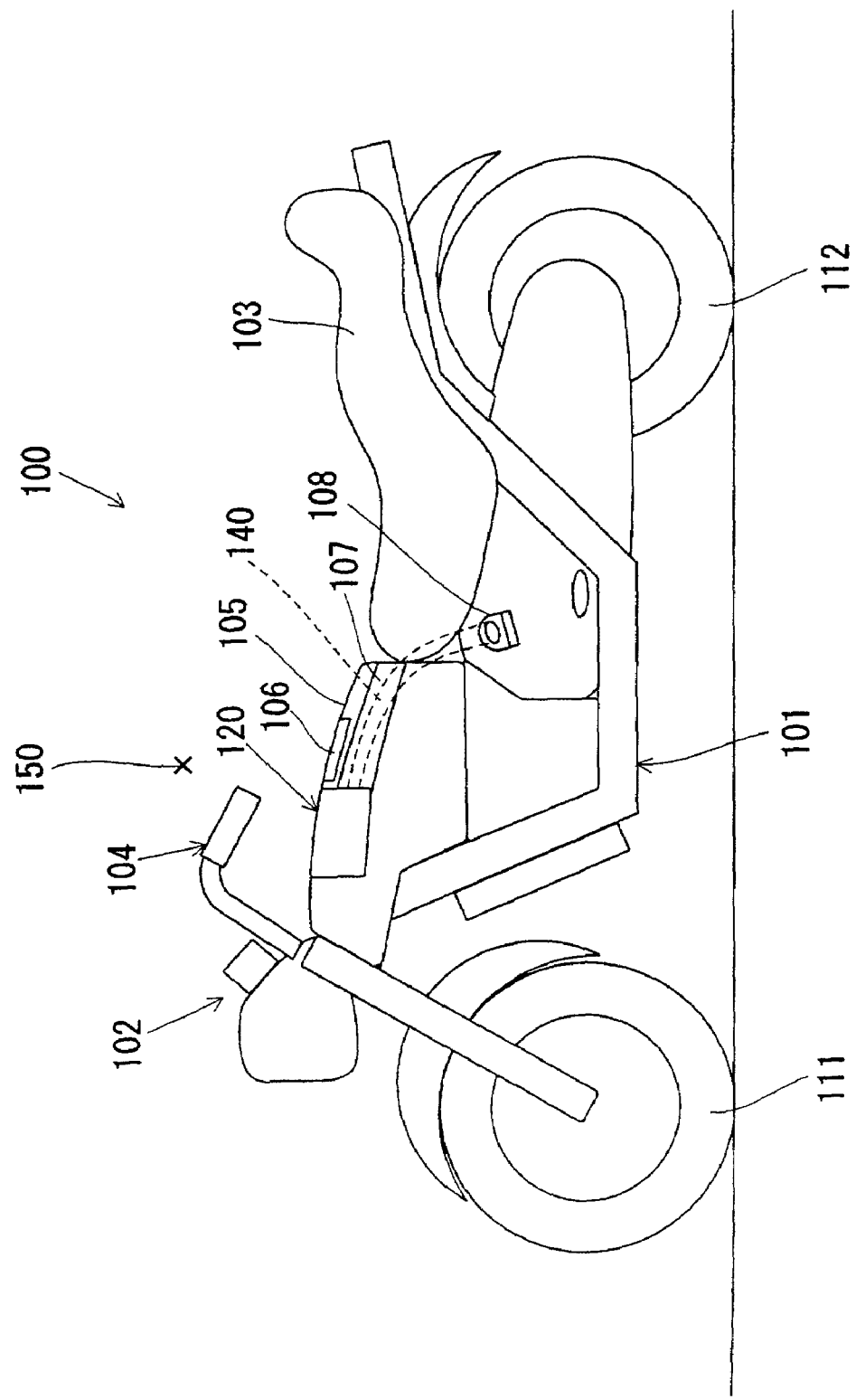
FIG. 1 is a side view of a motorcycle 100 according to an embodiment of the invention, in which an airbag system 120 is mounted to the motorcycle 100.
Figure 2:
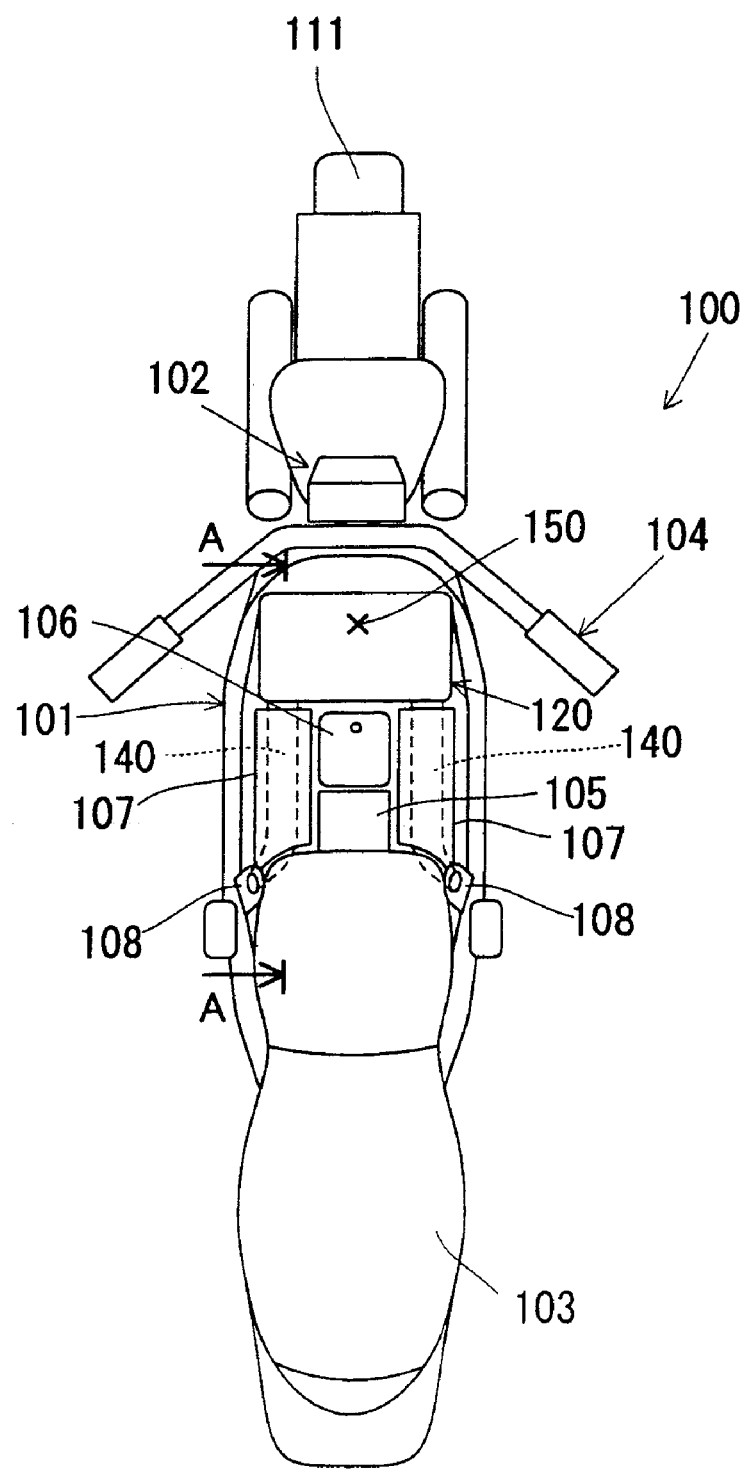
FIG. 2 is a top view of the motorcycle 100 in FIG. 1.

The present invention will be further illustrated with examples below. Referring first to FIGS. 1 and 2, the entire structure of a motorcycle 100 will be described. FIG. 1 is a side view of the motorcycle 100 according to an embodiment of the invention, to which an airbag system 120 is mounted. FIG. 2 is a top view of the motorcycle 100 in FIG. 1. The motorcycle 100 of the embodiment corresponds to the "motorcycle with an airbag system" or the "motorcycle" of the invention.

As shown in FIGS. 1 and 2, the motorcycle 100 is a so-called touring motorcycle mainly composed of a body frame 101 including an engine and a main frame; a seat 103 that a rider can straddle; a handlebar 104; a front wheel 111; and a rear wheel 112.

The region above the body frame 101 of the motorcycle 100 and in front of the rider seated in the seat 103 is specified as a rider restraint region 150 in the event of a head-on collision of the motorcycle 100. The "head-on collision" in the embodiment broadly includes that the motorcycle 100 collides with a front object (not shown for convenience sake, for example, motorcycles, various vehicles other than motorcycles, pedestrians, obstacles, or guardrails). The "rider restraint region 150" of this embodiment corresponds to the "rider restraint region" of the invention, which is defined as a space extending in the direction of the forward movement of the rider seated in the seat 103 by a kinetic energy during a head-on collision, for restraining the rider who is flung ahead of the motorcycle 100.

A front part 102 of the body frame 101 at the front of the vehicle has a headlight, various meters, switches, a windshield and so on. A fuel tank 106 is disposed in front of a vehicle component 105 in the region between the front part 102 and the seat 103. An airbag system (also referred to as an airbag module) 120 is disposed ahead of the fuel tank 106. The fuel tank 106 is provided with webbing covers 107 on both sides thereof, for covering a pair of right and left webbings 140 which is a component of the airbag system 120. In a normal state in which the airbag system 120 is not operating, the webbings 140 extend in the housing space between the webbing covers 107 and the vehicle component 105, so that they cannot be seen or hardly seen from the exterior by the covering of the webbing covers 107. The details of the webbings 140 will be described later in the description of the structure of the airbag system 120.

Figure 3:
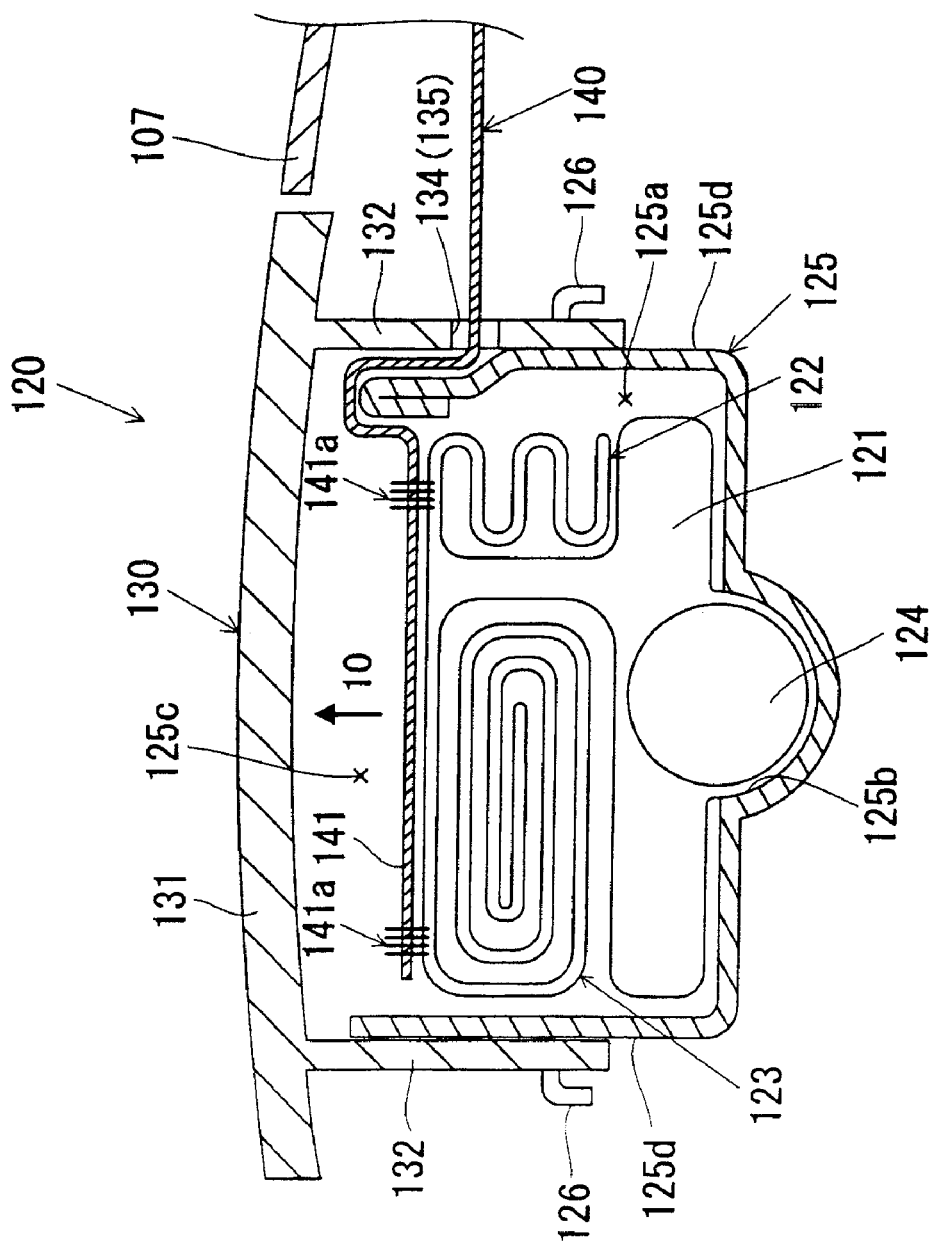
FIG. 3 is a cross sectional view of the motorcycle 100 taken along line A-A of FIG. 2.
Figure 4:
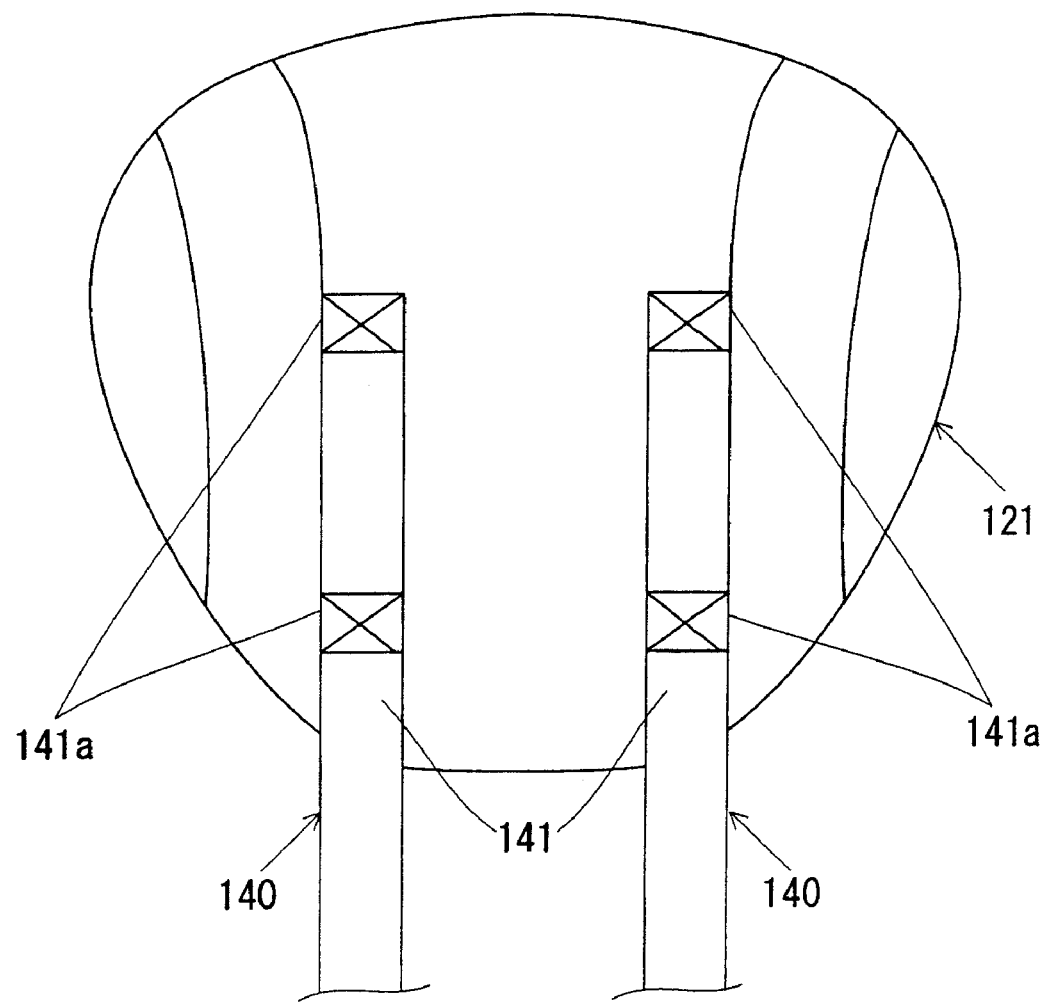
FIG. 4 is a plan view of an airbag 121 before it is housed in a retainer 125 in the airbag system 120 of FIG. 2.

Referring to FIGS. 3 and 4, the structure of the airbag system 120 of this embodiment will be specifically described. FIG. 3 shows the cross section of the motorcycle 100 taken along line A-A of FIG. 2. FIG. 4 is a plan view of an airbag 121 in the airbag system 120 of FIG. 2 before it is housed in a retainer 125. The airbag system 120 is disposed so as to face the rider restraint region (the rider restraint region 150 in FIG. 1) for the rider seated in the seat 103. The airbag system 120 corresponds to the "airbag system" of the invention.

Referring to FIG. 3, the airbag system 120 of the embodiment is mainly composed of the airbag 121, an inflator 124, the retainer 125, a module cover 130, and the webbings 140. In FIG. 3, the right is the rear of the vehicle, and the left is the front of the vehicle.

As shown in FIG. 4, the airbag 121 has stitched portions 141a to which a first end 141 of each webbing 140 is sewn. In this embodiment, the stitched portions 141a are provided at a rider's head restraint portion (a rider's head restraint portion 122a, to be described later), so that the webbings 140 are attached to the rider's head restraint portion. The airbag 121 is made of the same material as that of car airbags into the shape of a bag, and is housed in the retainer 125 in a predetermined folded state such that the stitched portions 141a with the webbings 140 are disposed upward.

Specifically, the airbag 121 is housed in the retainer 125 in a folded state in which, a rider-side airbag part 122 of the airbag which protrudes toward the rider (or toward the rear of the vehicle) during inflation is accordion-pleated such that the pleats are piled in the vertical direction, and a front airbag part 123 which protrudes toward the front of the vehicle during inflation is rolled up toward the front of the vehicle (refer to FIG. 3). The accordion pleats of the rider-side airbag part 122 are defined as pleats in which the rider-side airbag part 122 is accordion-pleated. The roll of the front airbag part 123 is defined as a roll in which the front airbag part 123 is rolled up. The rider-side airbag part 122 is disposed at the rear of the housing space of the retainer 125, and the front airbag part 123 is disposed at the front of the housing space. Referring to FIG. 3, the direction of the protrusion (deployment) of the airbag 121 in a collision is indicated by arrow 10. The airbag 121 corresponds to the "airbag" of the invention.

Each webbing 140 is a long tether, the first end 141 of which is stitched to the airbag 121, and a second end is connected to a fastener (a fastener 108 in FIGS. 1 and 2) of the body. The webbings 140 extend in parallel at two portions in the front-back direction between the airbag system 120 and the body of the motorcycle 100 to connect the airbag 121 to the body. This ensures the stability of the deployment motion of the airbag 121, and the stability of the inflated airbag 121 in restraining the rider with the webbings 140. Particularly, the use of the pair of right and left webbings 140 allow the rider-restraining stability to be improved by balancing the deployment of the right and left of the airbag 121. The webbings 140 are made of the same webbing material as that of car seatbelts (shaped like a belt-like member made of resin fibers) or the same material as that of an airbag fabric into the shape of a belt. The webbings 140 may be shaped like a strap in place of the belt. The webbing 140 to be attached to the airbag 121 may be one or more as appropriate.

An inflator 124 is configured as a device for generating airbag-inflation gas at a vehicle collision so that the airbag 121 in a folded state is inflated while deploying from the retainer 125 and for supplying the gas into the airbag 121. The inflator 124 may be configured such that either it is housed in the bag-shaped airbag 121 and supplies the generated airbag-inflation gas directly into the airbag 121, or it is connected to the airbag 121 through a gas supply passage and indirectly supplies the generated airbag-inflation gas into the airbag 121 through the gas supply passage. The inflator 124 corresponds to the gas supply device of the invention.

The retainer 125 is a bottomed-box casing for housing the airbag 121 in the folded state and the inflator 124. Specifically, the retainer 125 has at least an airbag housing portion 125a for housing the airbag 121 and an inflator housing portion (recessed portion) 125b for housing the inflator 124. An airbag opening 125c at the top of the retainer 125 allows the deployment of the airbag 121. With the airbag 121 in a housed state, the webbings 140 are disposed inside the outer shape of the retainer 125 and on the top of the airbag opening 125c. The retainer 125 corresponds to the "airbag housing portion" of the invention.

The module cover 130 covers the airbag 121 in a housed state by covering the airbag opening 125c of the retainer 125 from above, and has at least a top plate 131 and a depending portion 132. The module cover 130 is typically made of a resin material by die molding. The top plate 131 of the module cover 130 is a plate extending substantially horizontally along the plane of the airbag opening 125c of the retainer 125 to define the upper surface of the airbag system 120. The depending portion 132 of the module cover 130 is a plate-like member extending from the lower surface (back surface) of the top plate 131 in the vertical direction crossing the extension of the top plate 131 along the wall 125d of the retainer 125 (mounted portion). The part of the depending portion 132 adjacent to the rear of the vehicle (adjacent to the rider) has a pair of left and right webbing through holes 134 that communicate the interior and the exterior of the module cover 130 with each other. This allows the webbings 140 to extend from the interior to the exterior of the module cover 130. The depending portion 132 is fixed to the retainer wall 125d with fasteners 126, so that the module cover 130 and the retainer 125 are joined to each other. The webbing through holes 134 are provided at a thin portion (fragile portion) of the depending portion 132, that is, a tear line 135.

Figure 5:
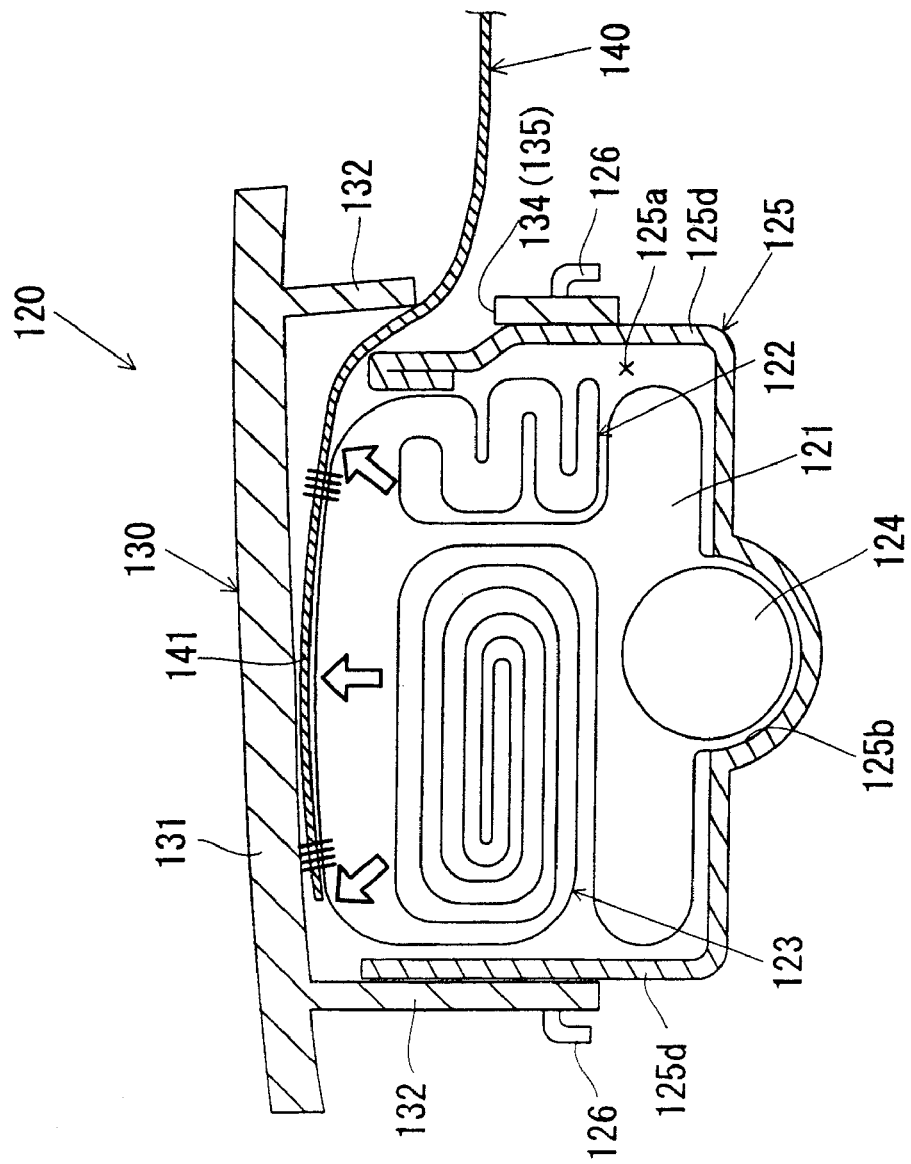
FIG. 5 is a diagram of the airbag 121 in an early stage of the deployment in the airbag system 120 of the embodiment.
Figure 6:
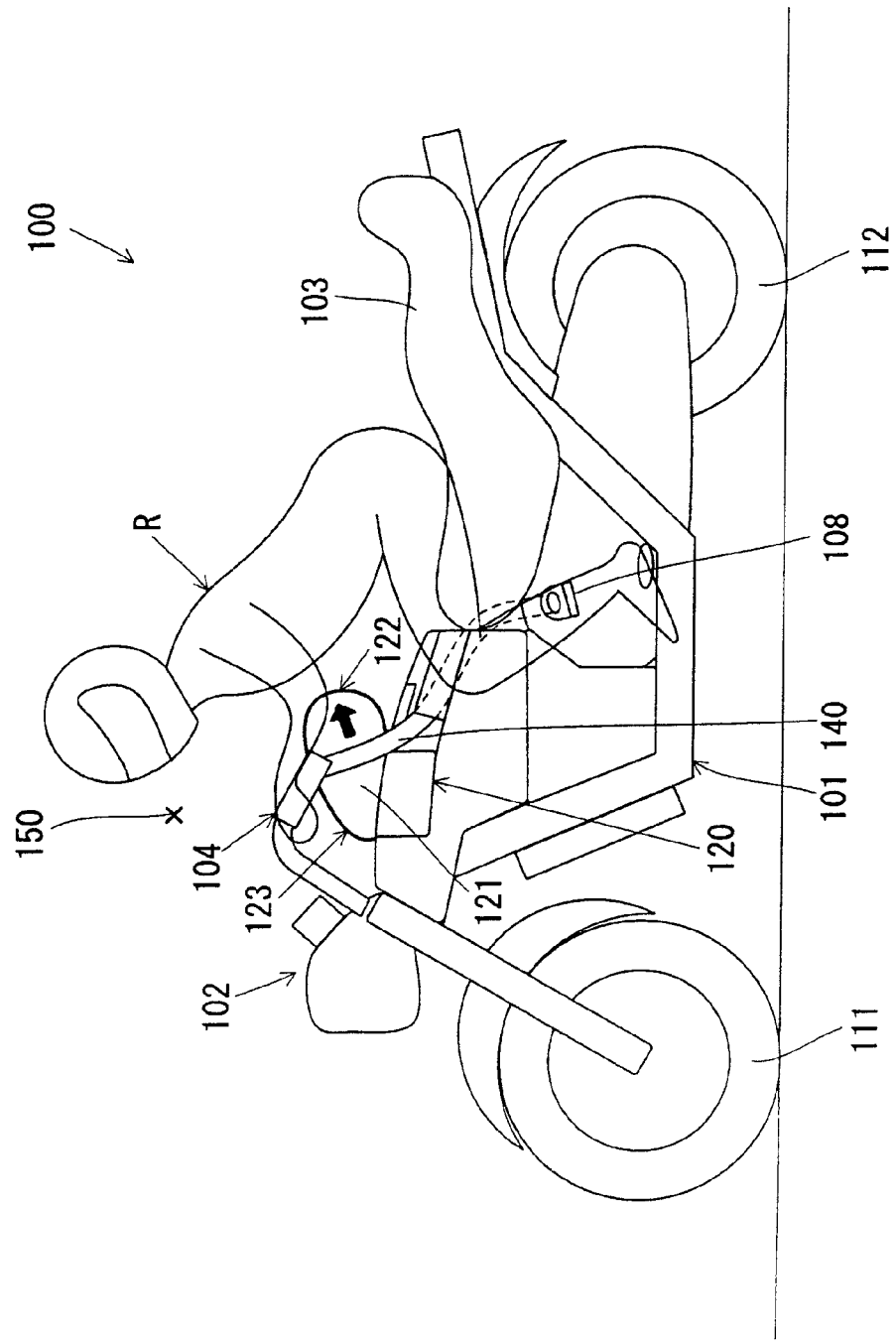
FIG. 6 is a diagram of the airbag 121 in an early stage of the deployment in the airbag system 120 of the embodiment.
Figure 7:
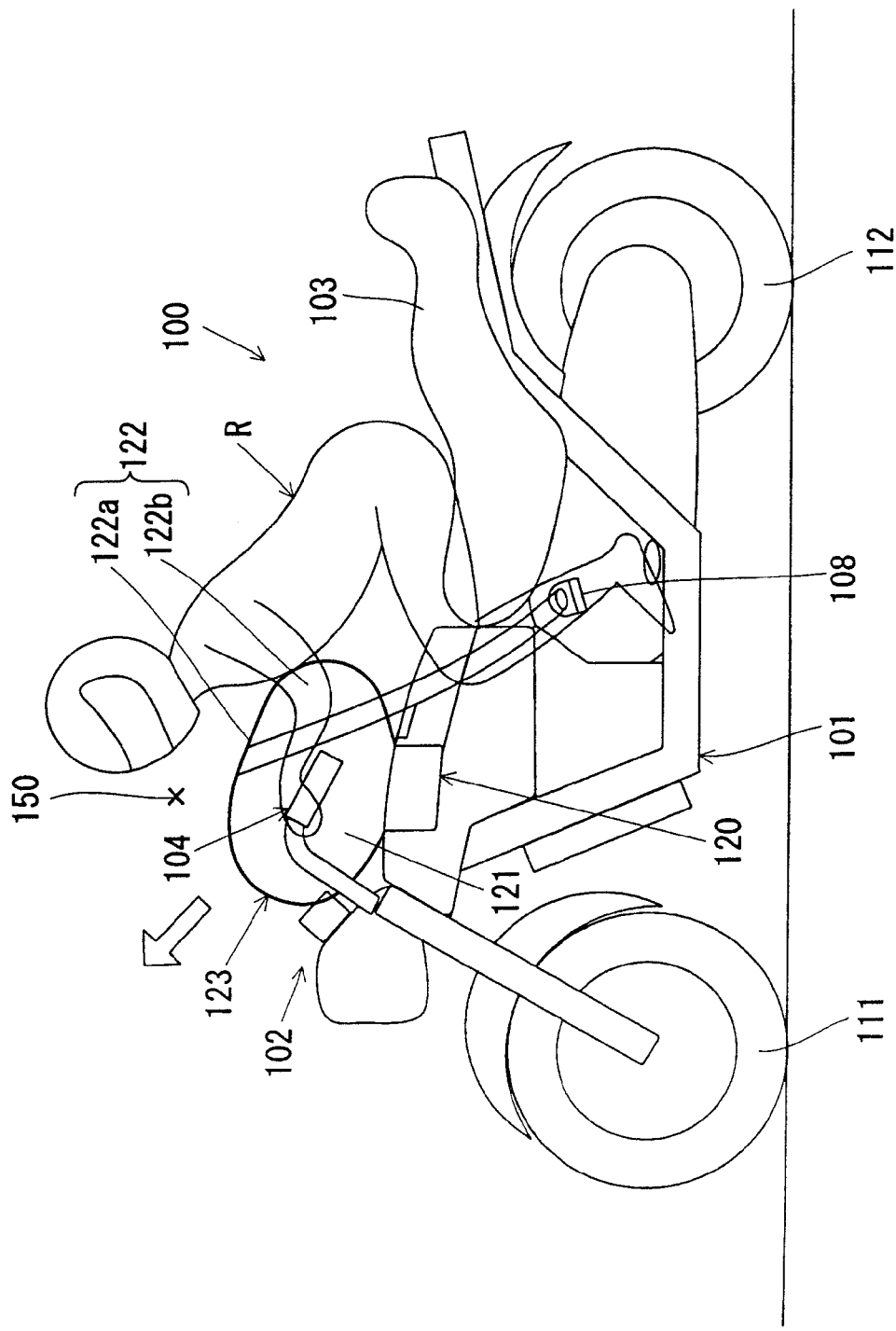
FIG. 7 is a side view of the motorcycle 100 when the airbag 121 of the embodiment is in the middle of deployment.
Figure 8:
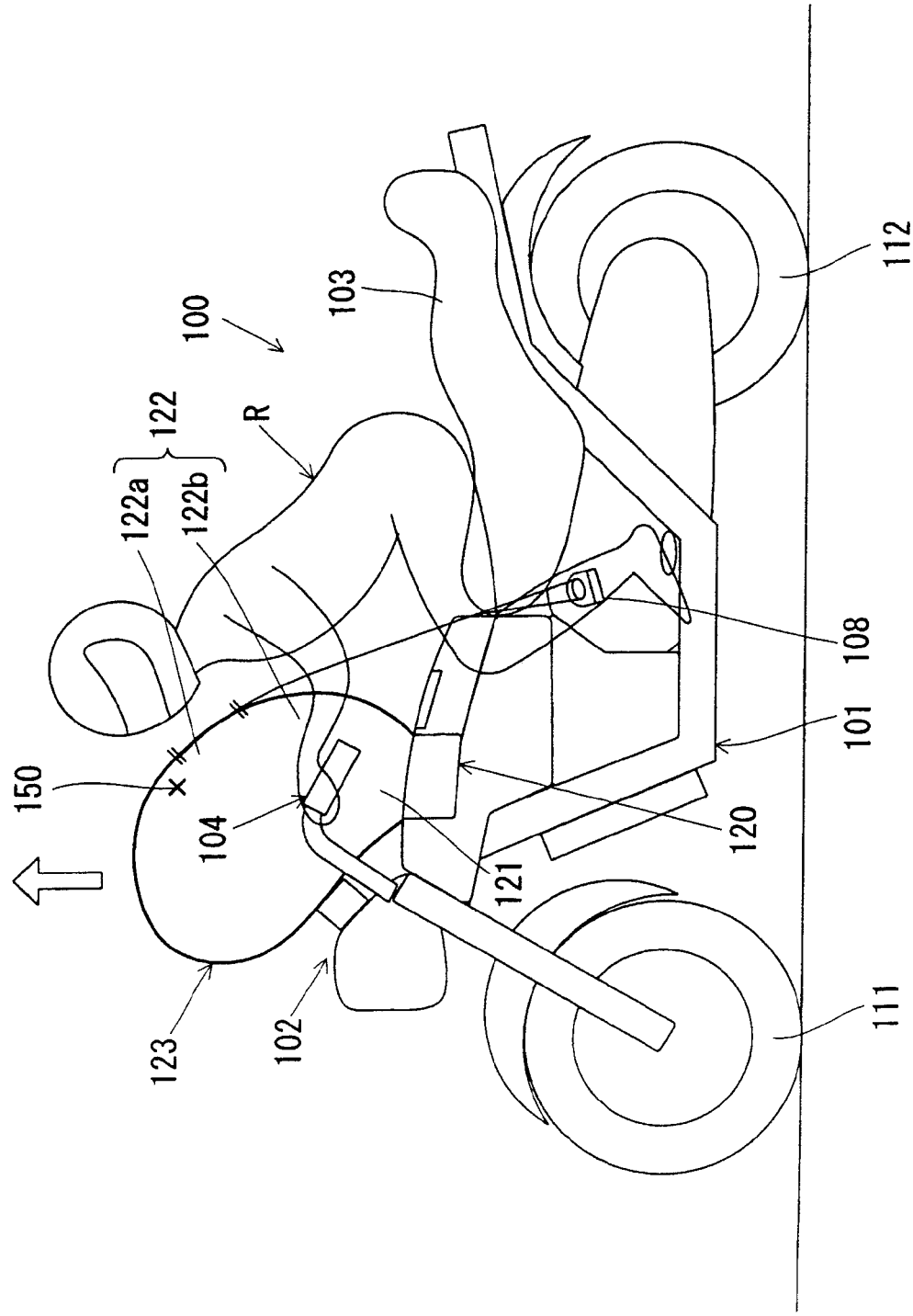
FIG. 8 is a side view of the motorcycle 100 when the airbag 121 of the embodiment is in the middle of deployment.
Figure 9:
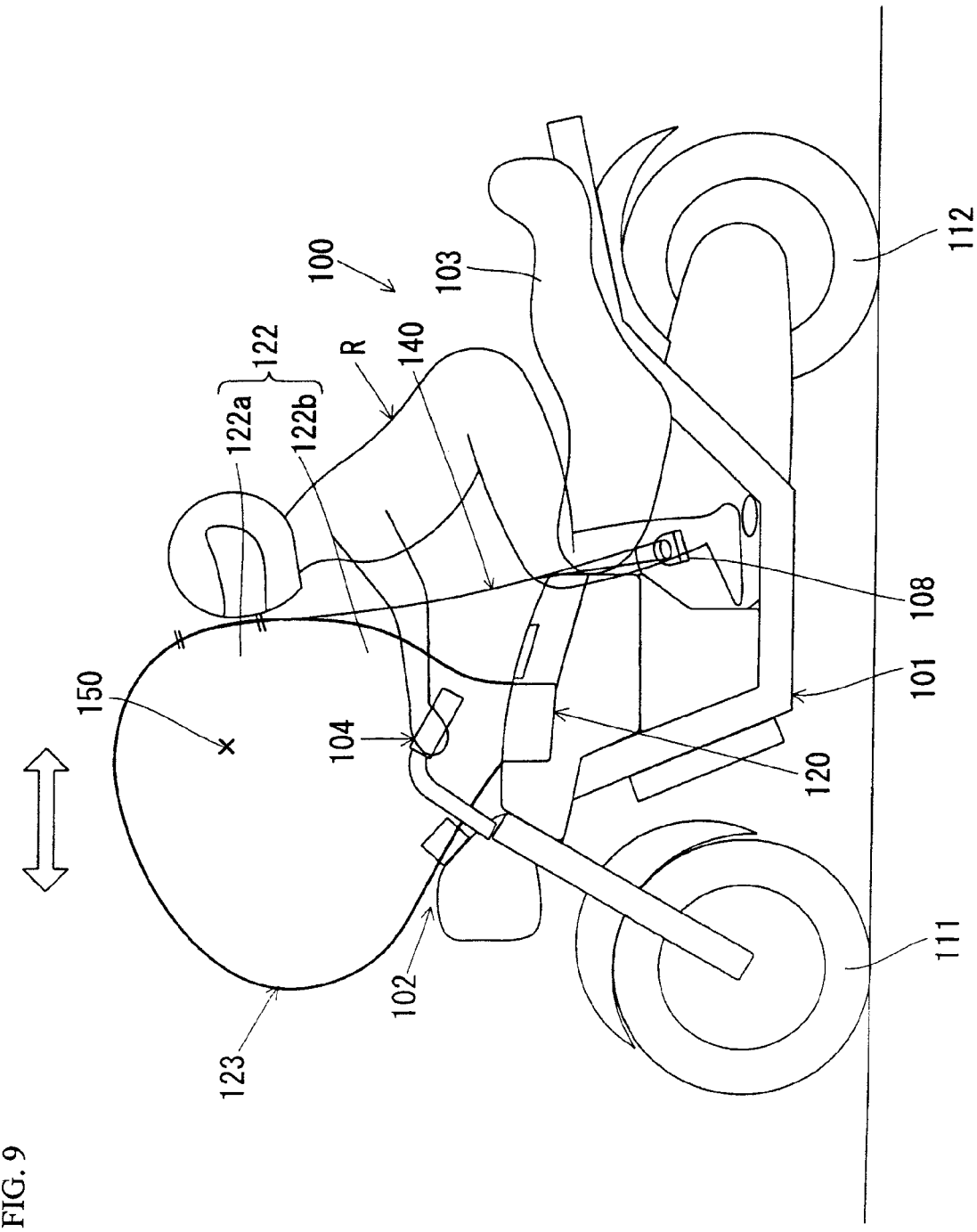
FIG. 9 is a side view of the motorcycle 100 when the airbag 121 of the embodiment is in the middle of deployment.
Figure 10:
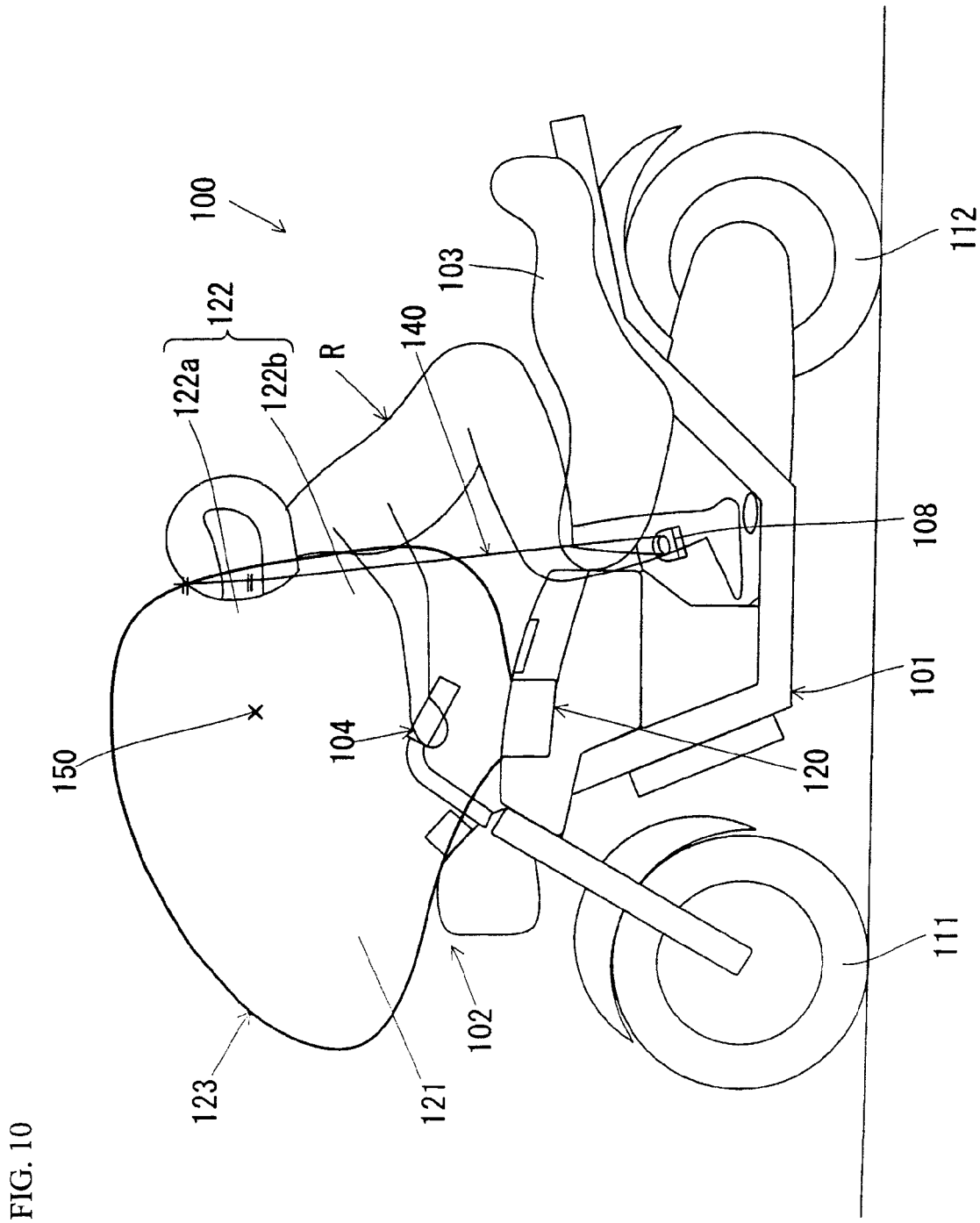
FIG. 10 is a side view of the motorcycle 100 when the airbag 121 of the embodiment has fully deployed.

The operation of the airbag system 120 with this arrangement will be described with reference to FIGS. 5 to 10. FIGS. 5 and 6 show the airbag 121 in an early stage of the deployment of the airbag 121 of the airbag system 120 of the embodiment; FIGS. 7 to 9 show the motorcycle 100 in the middle of the deployment of the airbag 121, as viewed from the side; and FIG. 10 shows the airbag 121 after completion of the deployment, as viewed from the side.

When the motorcycle 100 comes into a collision in the traveling direction, the rider is moving (being flung) ahead of the motorcycle 100. In the embodiment, upon detection of the head-on collision, the inflator 124 of the airbag system 120 is activated to start to supply the inflation gas generated by the inflator 124 into the airbag 121. Thus, the airbag 121 starts to protrude (deploy) in the direction of arrow 10 in the airbag system 120 of FIG. 3 in an inoperative state. Since the inflation gas is continuously supplied into the airbag 121, the airbag 121 sequentially forms an inflated section from the inflator 124.

Referring to FIG. 5, directly after the activation of the airbag system 120, the airbag 121 pushes the top plate 131 of the module cover 130 from below by the deploying force. When receiving the deploying force from the airbag 121, the top plate 131 is torn open along the tear line 135 to deploy to the front of the vehicle with the front of the depending portion 132 as a hinge to release the cover of the airbag opening 125c of the retainer 125. This allows the deployment of the airbag 121, so that the airbag 121 protrudes out of the retainer 125 through the airbag opening 125c of the retainer 125. Upon the deployment of the airbag 121, a tensile load is started to be applied to the webbings 140 stitched to the airbag 121 through the first ends 141. Thus, the webbings 140 push open the webbing covers 107 upward to release the covering by the webbing covers 107.

As the airbag 121 of this embodiment is housed in the retainer 125 in a folded state in which the rider-side airbag part 122 is accordion-pleated such that the pleats are piled in the vertical direction, and the front airbag part 123 is rolled up toward the front of the vehicle. The fold release resistance of the pleated rider-side airbag part 122 is lower than that of the rolled front airbag part 123. The "release resistance" here is for releasing the fold, which is necessary to recover from a specified folded state to the state before the fold and substantially has a correlation with the recovery time until it recovers the state before the fold. That is, the recovery time necessary for releasing the fold becomes relatively long when the release resistance is relatively high whereas the recovery time necessary for releasing the fold becomes relatively short when the release resistance is relatively low.

Accordingly, as shown in FIG. 6, the airbag 121 inflates earlier in the rider-side airbag part 122 than the other airbag parts including the front airbag part 123 at the early stage of the inflation in the event of the head-on collision of the motorcycle. Thus, the rider R is quickly restrained by the inflated rider-side airbag part 122. With this arrangement in which the rider-side airbag part 122 deploys earlier than the other airbag parts (hereinafter, referred to as "a first arrangement"), the remaining airbag parts (the front airbag part 123) can be inflated with stability by the support of the first inflated rider-side airbag part 122. This provides the advantages of ensuring the stability of deploying action of the airbag 121. Since this advantage is given also by the webbings 140 (hereinafter, referred to as "a second arrangement"), it is preferable to have both the first arrangement and the second arrangement in order to improve the stability of the deploying action of the airbag 121. However, the second arrangement (the webbings 140) can be omitted provided that stability of a desired level can be ensured only by the first arrangement. The "rider-side airbag part 122" here corresponds to the "rider-side airbag part" of the invention, and the "front airbag part 123" corresponds to the "front airbag part" and the "other part of the airbag" of the invention.

For the airbag system 120 of this type to be mounted to a motorcycle, it is desirable that the airbag 121 (the rider-side airbag part 122) not only inflate to the rider restraint region 150 ahead of the rider R but also inflate according to the situation. Specifically, when the airbag 121 first inflates toward the head of the rider who leans forward in a head-on collision of the motorcycle, the load from the airbag 121 applied in the direction opposite to the moving direction of the rider may be applied to the rider's head.

Therefore, this embodiment proposes a technique for further improving rider restraint performance not only by inflating the airbag 121 to the rider restraint region 150 but also by taking the order of deployment to the rider's head or the rider's chest into consideration. Specifically, the embodiment is constructed such that when the airbag 121 shown in FIG. 6 further inflates, the webbings 140 disposed on the airbag 121 and attached to the rider's head restraint portion 122a restrict the deploying action of the airbag 121, thereby controlling the deploying action.

With this arrangement, as shown in FIG. 7, the deployment of the rider's head restraint portion 122a of the rider-side airbag part 122 toward the rider's head is restricted by the webbings 140, so that a rider's chest restraint portion 122b first deploys toward the rider's chest and then the rider's head restraint portion 122a deploys toward the rider's head. The "rider's head restraint portion 122a" here is a region for mainly restraining the head or the face of the rider R, while the "rider's chest restraint portion 122b" is a region for mainly restraining the chest of the rider R. With the rider's chest restraint portion 122b first deploying toward the rider's chest, the rider's chest restraint portion 122b pushes the chest of the rider R in a forward leaning posture toward the rear of the vehicle while softly receiving it, thereby raising the upper body of the rider R. In this state, the deployment of the rider's head restraint portion 122a toward the rider's head is restricted by the webbings 140, allowing decreasing the load applied to the head of the rider R from the rider's head restraint portion 122a in the direction opposite to the movement of the rider R.

Then, in the airbag 121 shown in FIG. 7, the front airbag part 123 protrudes to the front of the vehicle (for example, along the empty arrow in FIG. 7) by the action of restricting the rider's head restraint portion 122a by the webbings 140, and then protrudes upward (for example, along the empty arrow shown in FIG. 8) through the deployment shown in FIG. 8. The front airbag part 123 protruding upward comes into the front of the head of the rider R, as shown in FIG. 9. Thus, this embodiment is configured such that the rider's chest restraint portion 122b first deploys toward the rider's chest, and then the rider's head restraint portion 122a deploys toward the rider's head, thus allowing the rider restraint performance by the airbag 121 to be improved while softly receiving the rider R with the airbag 121. This embodiment in which the front airbag part 123 is rolled toward the front of the vehicle is advantageous in smoothly achieving a series of deploying action of the front airbag part 123 shown in FIGS. 7 to 9, that is, the action of deploying to the front of the vehicle and then deploying upward.

Furthermore, the whole of the airbag 121 protrudes in the front-back direction (for example, along the empty arrow in FIG. 9) into a fully inflated state in which the airbag 121 has completely deployed, as shown in FIG. 10. In this fully inflated state, the inflated airbag 121 fills the rider restraint region 150 in front of the rider R, so that the rider R who is moving forward by the kinetic energy in a collision is restrained by the inflated airbag 121 and the impact which acts on the rider R in the restraint is alleviated.

In this fully inflated state, the webbings 140 extend fully substantially in a straight line between the airbag 121 and the fastener 108, thereby restricting the upward and forward action of the airbag 121 by the tension of the webbings 140. The fully inflated airbag 121 comes into contact with the front part 102 at the front and with the handlebar 104 at both ends. This arrangement can stabilize the restraint of the rider R with the fully inflated airbag 121.

Thus, according to the embodiment, the airbag 121 is folded in such a manner that the rider-side airbag part 122 is folded so as to deploy earlier than the other airbag parts including the front airbag part 123 (the rider-side airbag part 122 is accordion-pleated and the front airbag part 123 is rolled up). Therefore, the inflated rider-side airbag part 122 of the airbag 121 can quickly restrain the rider R. Particularly, since the rider-side airbag part 122 whose release resistance is set relatively low is disposed at the rear of the housing space of the retainer 125, the rider-side airbag part 122 can be quickly inflated toward the rider R in the early stage of the inflation of the airbag 121. Moreover, since the way of folding the airbag 121 is devised so that the fold release resistance of the rider-side airbag 122 is low, the rider restraint performance of the airbag 121 can be improved by a simple structure.

The combination of the folded state of the rider-side airbag part 122 and that of the front airbag part 123 may be changed as appropriate provided that the fold release resistance of the rider-side airbag part 122 is set lower than that of the front airbag part 123. In addition to the arrangement of this embodiment in which the rider-side airbag part 122 is accordion-pleated and the front airbag part 123 is rolled up, the invention may adopt, for example, a first arrangement in which both the rider-side airbag part 122 and the front airbag part 123 are accordion-pleated, and the number of folds of the rider-side airbag part 122 is set smaller than that of the front airbag part 123 and a second arrangement in which both the rider-side airbag part 122 and the front airbag part 123 are rolled up and the number of folds (the number of windings) of the rider-side airbag part 122 is set smaller than that of the front airbag part 123.

According to this embodiment, the webbings 140 attached to the rider's head restraint portion 122a restrict the deployment of the airbag 121 toward the rider's head, so that, the rider's chest restraint portion 122b of the parts of the airbag 121 is first inflated toward the rider's chest, and then the rider's head restraint portion 122a is inflated toward the rider's head. This arrangement allows a decrease in the load applied to the head of the rider R from the rider's head restraint portion 122a. This embodiment particularly provides a strategic arrangement in which the webbings 140 for connecting the airbag 121 to the motorcycle are used as a device for restricting the deployment of the airbag 121 toward the rider's head. The invention may adopt not only the arrangement in which the webbings 140 are used as the device for first inflating the rider's chest restraint portion 122b of the airbag 121 toward the rider's chest but also an arrangement in which the way of folding the airbag 121 is devised.

It is to be understood that the invention is not limited to the foregoing embodiment but various applications and modifications may be made. For example, the following embodiments to which the foregoing embodiment is applied may be made.

Although the embodiment has been described for the touring motorcycle 100, the invention may also be applied to other types of motorcycle such as a motor scooter that has a space for lateral movement of the rider's legs between the handlebar and the seat, or motorcycles other than the motorcycle 100.

Although the embodiment has been described for the case in which the airbag system 120 is disposed in front of the fuel tank 106, the position of the airbag system 120 can be varied as appropriate provided that the airbag 121 can deploy in a desired region. The airbag system 120 may be disposed behind or lower than the position shown in FIG. 1.

What is claimed is:

1. An airbag apparatus for a motorcycle, the airbag apparatus comprising:
    an airbag to be deployed and inflated for protecting a rider of the motorcycle;
    a rearward portion of the inflated airbag that is at least partially accordion-folded prior to deployment;
    a forward portion of the inflated airbag that is at least partially roll-folded prior to deployment, wherein the accordion-folded rearward portion deploys before the roll-folded forward portion of the airbag;
    a head restraint portion of the rearward portion of the airbag which is inflatable toward a head of the rider;
    a chest restraint portion of the rearward portion of the airbag which is inflatable toward a chest of the rider; and
    a tether attached to the head restraint portion at one end thereof and for being anchored to the motorcycle at its other end so that the airbag is deployed sequentially with the chest restraint portion deployable initially toward the rider's chest, then the head restraint portion is deployable toward the rider's head, and finally the forward portion is deployed and unrolled toward a front of the motorcycle.

2. The airbag apparatus of claim 1 wherein the rearward portion of the airbag is smaller than the forward portion of the airbag.

3. A motorcycle comprising:
    a body including a seat for a rider;
    an airbag for being deployed and inflated upon detection of a collision of the motorcycle;
    an inflator for supplying inflation gas to the airbag;
    a retainer for housing the airbag in a folded state and mounted forwardly of the seat in a fore-and-aft direction along the body,
    a first compact folded body of the airbag in the folded state disposed rearwardly in the retainer to be positioned adjacent to the rider; and
    a second compact folded body disposed forwardly in the retainer to be positioned side-by-side with the first compact folded body in the fore-and-aft direction and further away from the rider in the fore-and-aft direction than the first compact folded body, with the first compact folded body configured to deploy before the second compact folded body.

4. The motorcycle of claim 3 wherein the first compact folded body has a lower fold release resistance than the second compact folded body.

5. The motorcycle of claim 3 wherein the first compact folded body is substantially accordion-folded and the second compact folded body is substantially roll-folded.

6. The motorcycle of claim 3 wherein the inflator is below and generally centrally between the compact folded bodies in the retainer.

* * * * *